(No Model.)
E. T. KEAGLE.
MEDICAMENT RETAINER FOR HORSES' FEET.
No. 330,241. Patented Nov. 10, 1885.
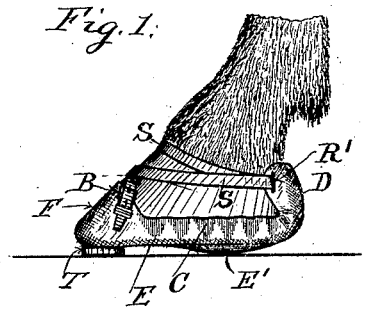
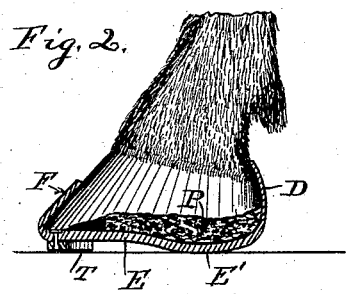
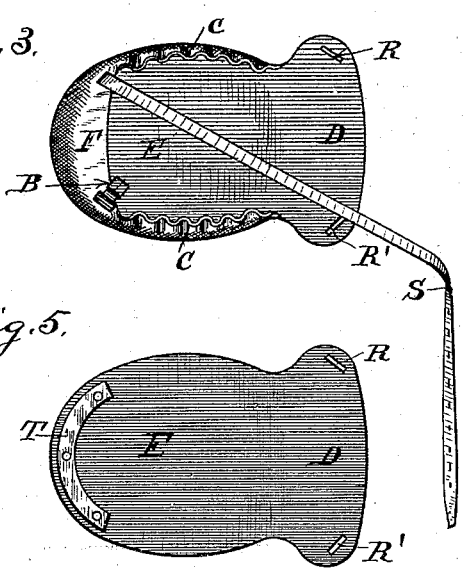
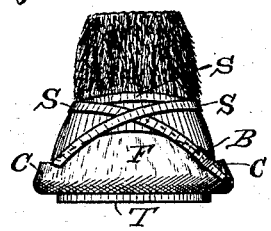
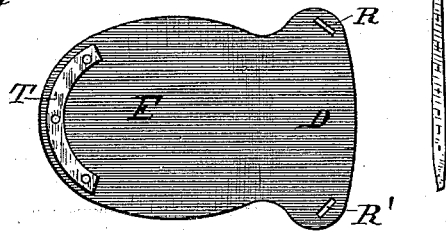
Witnesses
Thos. H. Hutchins.
Wm. J. Hutchins.
Inventor.
Edward T. Keagle.

UNITED STATES PATENT OFFICE.

EDWARD T. KEAGLE, OF MARSEILLES, ILLINOIS.

MEDICAMENT-RETAINER FOR HORSES' FEET.

SPECIFICATION forming part of Letters Patent No. 330,241, dated November 10, 1885.

Application filed August 28, 1885. Serial No. 175,532. (No model.)

*To all whom it may concern:*

Be it known that I, EDWARD T. KEAGLE, a citizen of the United States of America, residing at Marseilles, in the county of La Salle and State of Illinois, have invented certain new and useful Improvements in Medicament-Retainers for Horses' Feet, of which the following is a specification, reference being had therein to the accompanying drawings.

This invention relates to certain improvements in a medicament-retainer for treating horses' feet, the construction of which is fully explained and set forth in the following specification and claims, reference being had to the accompanying drawings, which form a part of this specification.

The object of my invention is to so construct a medicament-retainer from india-rubber that it may be placed on the foot of a horse either with or without a shoe, and thoroughly secured by means of a strap secured to said retainer and passed through loops or slits therein in such a manner as to hold a medicated sponge or other spongy substance placed in the retainer in contact with the frog and bottom part of the foot, and to form a receptacle to hold any liquid substance which may be squeezed from the sponge by pressure, so it may be taken up again by the sponge when pressure is relieved, and to be adapted to fit any horse's foot within certain limits—that is, so that two or three different sizes can be fitted to the varied sizes of horses' feet, and also to prevent them from being worn out by the pawing of a horse, and at the same time leave the shell of the hoof exposed to the free circulation of air and not in contact with the medicament.

Referring to the drawings, Figure 1 is a side view of my medicament-retainer, showing it placed on a horse's foot. Fig. 2 is a central vertical longitudinal section of my medicament-retainer as it would appear on a horse's foot, a portion of the hoof being broken away to show the medicated sponge, which is placed along the side of the frog. Fig. 3 is a top plan view showing the retainer as it would appear when not in service. Fig. 4 is a front view of my medicament-retainer placed on a horse's foot to more clearly show the manner of securing the strap, and Fig. 5 is a bottom plan view of the retainer.

E represents the sole having its rear portion slightly depressed, as shown at E'. F is a fore piece, which forms a pocket for the toe of a horse's foot, and has secured thereto the strap S and buckle B. D is a heel-piece having slits or loops arranged one in each side, as shown at R R', and is adapted to be held up around the heel of a horse's foot by strap S, passed through said loops in the manner shown in Figs. 1 and 4. C C are corrugated or crimped upturned sides, and, together with the front piece, F, and heel-piece D, when placed on a horse's foot, form the side of a receptacle, said sides being corrugated or crimped, so as to readily expand so it may be fitted to horses' feet of different sizes; and T is a metal toe-plate, placed on the front bottom part of sole E by rivets, as shown in Figs. 2 and 5, to prevent the retainer from being worn by the pawing of a horse.

P represents a medicated sponge (see Fig. 2) placed in the retainer and under the horse's foot.

The manner of securing my medicament-retainer on a horse's foot is as follows: I first place the foot on the sole E, so the toe fills the front piece, F. I then place the medicated sponge at the desired place at the bottom of the foot and draw up the heel-piece D closely around the heel. I then pass strap S diagonally across the fore part of the hoof and through slit R', thence around the upper front part of the hoof to and through slit R, thence diagonally across the fore part of the hoof, under the first-placed part to buckle B, where it is tightly secured, as shown in Figs. 1 and 4.

This retainer is adapted for holding a medicated sponge for treating horses' feet where they have become diseased or sore or have become dry and cracked, and is also adapted to simply hold a wet sponge in contact with a horse's foot, when standing in a stable, to prevent the foot from contact with the floor and manure in a stable to prevent contraction of diseases in that manner.

I am aware that soaking-boots and devices for treating horses' feet with a medicament have heretofore been used; hence I do not claim such, broadly; but I am not aware that such a medicament-retainer as I have shown and described has ever before been known or used.

Having thus described my invention, what I claim as new and useful, and desire to secure by Letters Patent, is as follows, to wit:

1. A medicament-retainer for horses' feet, constructed and arranged to be secured to a horse's foot, substantially as shown and described, and having a toe-pocket, upturned sides, and heel-piece adapted to retain a medicament in contact with the bottom of the horse's foot and to leave the shell of the hoof exposed to the air, as specified.

2. A medicament-retainer for horses' feet, substantially as shown and described, consisting of the sole E, having the toe-plate T, secured thereto, front piece, F, having the strap S and buckle B, heel-piece D, having slits R R', and corrugated crimped upturned sides C C, as and for the purpose set forth.

3. In an india-rubber medicament-retainer for horses' feet having a sole, a pocketed toe-piece, and a heel-protecting piece, the corrugated or crimped upturned sides C C, substantially as and for the purpose set forth.

EDWARD T. KEAGLE.

Witnesses:
J. LEHMAN,
ELIAS DANIELSON.